April 8, 1958   C. W. KEEGIN   2,830,284
AUDIBLE SIGNAL SYSTEM
Filed Aug. 6, 1954
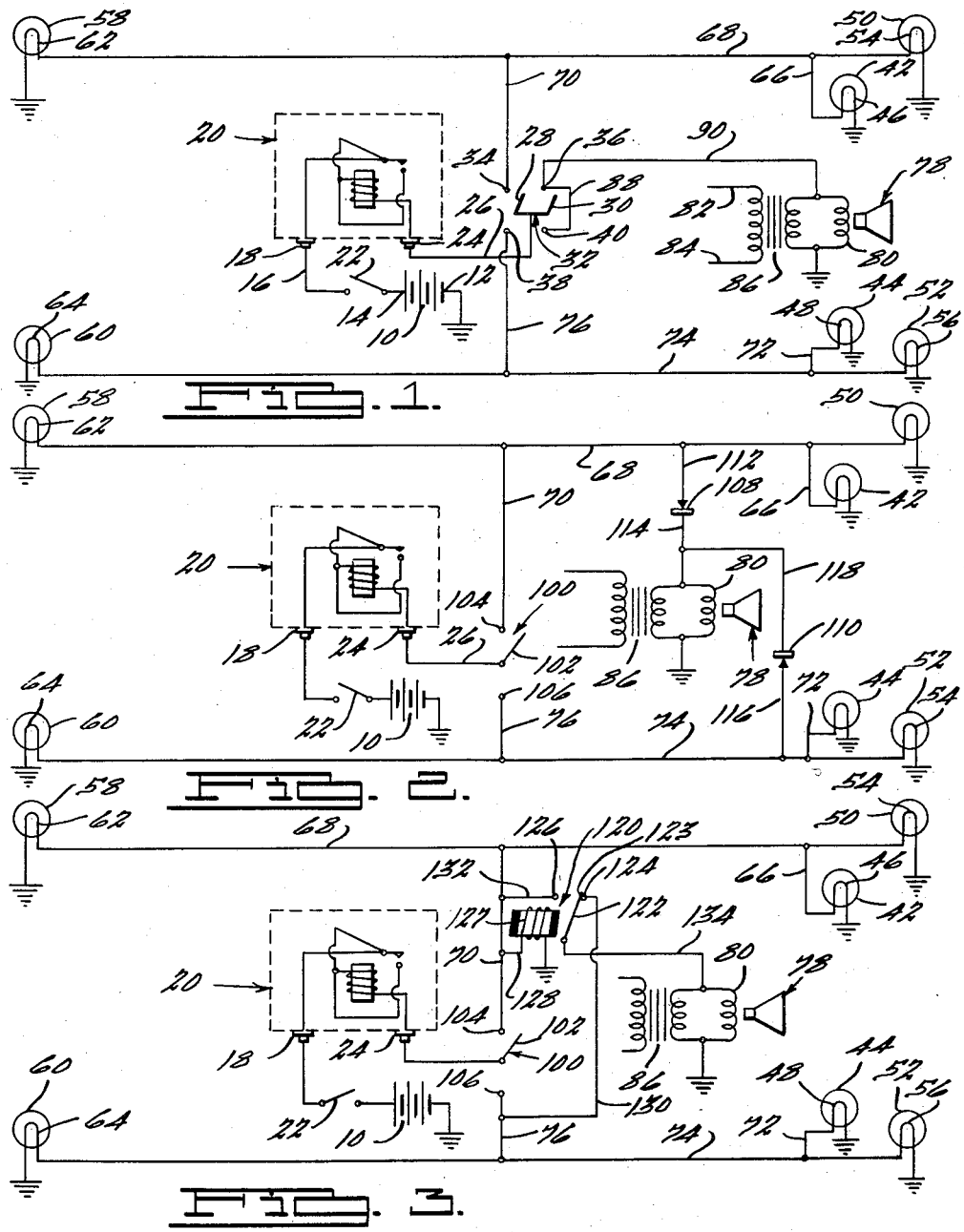
INVENTOR.
Curtis W. Keegin
BY
Harness, Dickey & Pierce
ATTORNEYS.

United States Patent Office 2,830,284
Patented Apr. 8, 1958

2,830,284

AUDIBLE SIGNAL SYSTEM

Curtis W. Keegin, Grosse Pointe, Mich.

Application August 6, 1954, Serial No. 448,178

8 Claims. (Cl. 340—75)

This invention relates to signaling systems and more particularly to an improved vehicular signaling system.

Heretofore, signaling systems have been provided on automotive vehicles for enabling the operator of the vehicle to signal that he intends to turn the vehicle. Such signal systems include a pilot lamp which is conventionally mounted on the dashboard of the vehicle and which is adapted to apprise the operator that the signal system is functioning. Such signal systems also include a turn switch which the operator selectively positions to complete circuits through selected signaling devices to indicate the direction in which he intends to turn, the turn switch being adapted to be returned to the off position automatically after the vehicle has completed the turn. However, prior signal systems of the indicated character have been subjected to the defect that the turn signal switch often fails to return automatically to the off position if a turn of less than 90° is made with the result that the signal system continues to operate after the turn has been completed. While the function of the pilot lamp is to apprise the operator that the signal system is operating, many drivers fail to notice the pilot lamp, particularly during daylight hours or when the traffic conditions are heavy, with the result that the signal system continues to operate long after the turn has been completed if the turn signal switch fails to return automatically to the off position. Such inadvertent signaling is both dangerous and annoying to other drivers.

An object of this invention is to overcome disadvantages in prior vehicular signaling systems and to provide an improved signaling system incorporating improved means for apprising the operator that the system is functioning.

Another object of the invention is to provide an improved vehicular signaling system incorporating improved means for producing an audible signal to apprise the operator that the system is functioning.

Another object of the invention is to provide an improved vehicular signaling system which may be supplied as a part of the original equipment of the vehicle or which may be conveniently combined with an existing vehicular signaling system.

Another object of the invention is to reduce the cost of manufacture, assembly and installation and to improve the durability, efficiency and operational reliability of a composite vehicular signalling system.

Other objects and advantages of the present invention will become apparent from the following description, the appended claims and the accompanying drawing, wherein:

Figure 1 is a schematic circuit diagram of one embodiment of a vehicular signaling system incorporating the present invention;

Fig. 2 is a schematic circuit diagram of another embodiment of a vehicular signaling system incorporating the present invention; and, Fig. 3 is a schematic circuit diagram of still another embodiment of a vehicular signaling system incorporating the present invention.

Referring to the drawing, the present invention is shown incorporated in a turn signal system of an automotive vehicle, although it will be understood that the present invention is applicable to other uses.

Referring more particularly to Figure 1, a turn signal system is shown which includes a battery 10, one terminal 12 of which is grounded, as to the frame (not shown) of the vehicle. The other terminal 14 of the battery 10 is electrically connected by a conductor 16 to an input terminal 18 of a flasher unit 20 through a switch 22 which may be operated concurrently with, or be a part of, the ignition switch of the vehicle. The flasher unit 20 may be of the type disclosed in U. S. Patent No. 1,979,349 issued to Schmidinger, and reference may be had thereto for its operation, the flasher unit 20 serving to interrupt the flow of current from the battery 10 in a well-known manner. The output terminal 24 of the flasher unit is connected by a conductor 26 to the blade elements 28 and 30 of a double-pole, double-throw switch, generally designated 32, which may operate concurrently with, or be a part of, the turn signal switch of the vehicle. The switch 32 also includes terminals 34, 36, 38, and 40, and the blade elements 28 and 30 are adapted to be selectively positioned so as to simultaneously contact the terminals 34 and 36 or to simultaneously contact the terminals 38 and 40.

A pair of pilot lamps 42 and 44 having filaments 46 and 48, respectively, are provided which may be mounted in any convenient location within the view of the operator of the vehicle, as for example, on the vehicle dashboard. A pair of front signal lamps 50 and 52 which include filaments 54 and 56, respectively, are mounted on opposite sides of the front portion of the vehicle so as to be visible exteriorly thereof, and a pair of rear signal lamps 58 and 60 which include filaments 62 and 64, respectively, are mounted on opposite sides of the rear portion of the vehicle so as to be visible exteriorly thereof. One terminal of each of the filaments 46, 54, and 62 is connected to ground, and the other terminal of each of the filaments 46, 54, and 62 is connected to the terminal 34 of the switch 32 by conductors 66, 68 and 70. One terminal of each of the filaments 48, 56 and 64 is connected to ground, while the other terminal of each of such filaments is connected to the terminal 38 of the switch 32 by conductors 72, 74 and 76.

A conventional speaker unit 78 having a voice coil 80 is provided which may be a part of the vehicle radio and which may be connected to the other components (not shown) of the radio by conductors 82 and 84 through a conventional transformer 86. The terminals 36 and 40 of the switch 32 are connected together by a conductor 88 and to one side of the voice coil 80 by a conductor 90, the other side of the voice coil 80 being connected to ground.

In the operation of this embodiment of the invention, assuming that the switch 22 is closed, the operator may signal a turn by selectively positioning the turn switch 32. Assuming that a left turn signal is desired, the turn switch 32 is positioned so that the blade elements 28 and 30 contact the terminals 34 and 36. A circuit is then completed from the battery 10 through the switch 22, a conductor 16, terminals 18 and 24 of the flasher unit 20, conductor 26 and the blade element 28 to ground through parallel circuits which include conductors 70, 68 and 66 and the filaments 46, 54 and 62. Upon completion of such circuits, the flasher unit 20 operates and the pilot lamp 42 flashes in conjunction with the signal lamps 50 and 58, thereby providing an indication that the operator intends to turn left. At the same time a circuit is completed through the blade element 30, conductor 90 and the voice coil 80 to ground, with the result that each time the circuit through the pilot lamp 42 and the signal lamps 50 and 58 is interrupted by the flasher unit 20, a relatively loud noise is also emitted from the speaker 78 to apprise the operator that the signal system is operating. Such noise will be emitted from the speaker each time the circuit is interrupted by the flasher unit 20 whether the radio is operating or not and may be readily discerned when the radio is operating.

When a right turn is desired, the turn switch 32 is positioned so that the blade elements 28 and 30 contact the terminals 38 and 40. A circuit is then completed from the flasher unit 20 through the conductor 26 and the blade element 28 to ground through parallel circuits which include conductors 76, 74 and 72 and the filaments 48, 56 and 64. Upon completion of such circuits, the flasher unit 20 operates and the pilot lamp 44 flashes in conjunction with the signal lamps 52 and 60. At the same time a circuit is completed through the blade element 30, conductors 88 and 90 and the voice coil 80 to ground with the result that the relatively loud noise is emitted from the speaker each time the flasher unit interrupts the circuits through the pilot lamp 44 and the signal lamps 52 and 60 thereby warning the operator that the signal system is functioning. If the turn signal switch fails to return automatically to the off position after the turn is completed, the noise emitted from the speaker 78 will warn the operator of such failure so that he may manually return the turn switch to the off position.

Another embodiment of the invention is illustrated in Fig. 2 and includes the battery 10, the ignition switch 22 the flasher unit 20, the pilot lamps 42 and 44, the signal lamps 50, 52, 58 and 60, and the speaker 78. In this embodiment of the invention, a single-pole, double-throw switch 100 is provided which may be operated concurrently with or be a part of the turn signal switch of the vehicle. The switch 100 includes a blade element 102 and terminals 104 and 106, the blade element 102 being connected to the terminal 24 of the flasher unit 20 by the conductor 26. The terminal 104 is connected to the filaments of the pilot lamp 42 and the signal lamps 50 and 58 by the conductors 70, 68 and 66, while the terminal 106 is connected to the filaments of the pilot lamp 44 and the signal lamps 52 and 60 by the conductors 72, 74 and 76 in the manner previously described. In this embodiment of the invention a pair of rectifiers 108 and 110 are provided which may be of any desired type, as for example, copper oxide or vacuum tube type rectifiers. One terminal of the rectifier 108 is connected to the terminal 104 by a conductor 112 and the conductors 68 and 70, while the other terminal of the rectifier 108 is connected to the voice coil 80 of the speaker 78 by a conductor 114. One terminal of the rectifier 110 is connected to the terminal 106 by a conductor 116 and the conductors 74 and 76, while the other terminal of the rectifier 110 is connected to the voice coil 80 by a conductor 118 and the conductor 114.

In the operation of this embodiment of the invention, assuming that the switch 22 is closed, the operator may signal a turn by selectively positioning the turn switch 100. Assuming that a left turn is desired, the turn switch is positioned so that the blade element 102 contacts the terminal 104. A circuit is then completed from the battery 10 through the switch 22, the conductor 16, the flasher unit 20, conductor 26, blade element 102 to ground through parallel circuits which include conductors 70, 68 and 66 and the filaments 46, 54 and 62. Completion of such parallel circuits causes the flasher unit 20 to operate and the pilot lamp 42 flashes in conjunction with the signal lamps 50 and 58, thereby indicating that the operator intends to turn left. At the same time a circuit is completed through the conductor 112, the rectifier 108, conductor 114 and the voice coil 80 to ground, with the result that a relatively loud noise is emitted from the speaker 78 each time the circuit is interrupted by the flasher unit 20. When the circuit is completed through the rectifier 108, the rectifier 110 prevents the completion of a circuit through the conductor 118 and the conductor 116 so that the circuits through the filaments 48, 56 and 64 remain open. When a right turn indication is desired, the turn switch 100 is positioned so that the blade element 102 contacts the terminal 106 to complete parallel circuits through the conductors 76, 74 and 72 and the filaments 48, 56 and 64. At the same time a circuit is completed through the conductor 116, the rectifier 110, the conductors 118 and 114, and the voice coil 80 to ground so that the relatively loud noise is emitted from the speaker 78 each time the flasher unit interrupts the circuit through the voice coil. When the circuit is completed through the rectifier 110, the rectifier 108 prevents the completion of a circuit through the conductors 114 and 112 so that the circuits through the lamps 42, 50 and 58 remain open.

Another embodiment of the invention is illustrated in Fig. 3 and includes the battery 10, ignition switch 22, flasher unit 20, the pilot lamps 42 and 44, the signal lamps 50, 52, 58 and 60, the speaker 78 and the single-pole double-throw switch 100. The terminals 104 and 106 of the switch 100 are connected to the filaments of the pilot lamps and the signal lamps in the manner previously described. In this embodiment of the invention a relay, generally designated 120, is provided having an armature 122 and contacts 124 and 126, the armature carrying a contact 123. One terminal of the coil 127 of the relay 120 is connected to the terminal 104 of the switch 100 by a conductor 128 and the conductor 70, while the other terminal of the coil 127 of the relay is connected to ground. The contact 124 of the relay 120 is connected to the terminal 106 of the switch 100 by a conductor 130, while the contact 126 of the relay is connected to the terminal 104 of the switch 100 by a conductor 132. The contact 123 carried by the armature 122 is normally closed with the contact 124 and is connected to one side of the voice coil 80 of the speaker 78 by a conductor 134, the opposite side of the voice coil being connected to ground.

In the operation of this embodiment of the invention, the blade element 102 of the switch 100 may be selectively positioned to contact the terminal 104 so as to complete the parallel circuits through the filaments 46, 54 and 58 to ground in the manner previously described thereby causing the pilot lamp 42 and the signal lamps 50 and 58 to flash intermittently to indicate a left turn. At the same time a circuit is completed through the conductor 128 and the coil 127 of the relay 120 to ground with the result that the relay operates and contact 123 carried by the armature 122 closes with the contact 126, thereby completing a circuit through the conductor 132, the contacts 123 and 126, the armature 122, the conductor 134 and the voice coil 80 to ground. A relatively loud noise will then be emitted from the speaker 78 each time the flasher unit 20 interrupts the circuit through the voice coil.

The operator may signal a right turn by selectively positioning the blade element 102 so that the blade element 102 contacts the terminal 106 to complete parallel circuits through the filaments 48, 56 and 64 in the manner previously described. At the same time a circuit is completed through the conductor 130, the contacts 123 and 124, the armature 122, the conductor 134, and the voice coil 80 to ground, with the result that the relatively loud noise is emitted from the speaker 78 in the manner previously described.

While preferred embodiments of the invention have been shown and described, it will be understood that various other changes and modifications may be made without departing from the spirit of the invention. For example, the present invention may be embodied in a signaling system which indicates that the hand brake of the vehicle is in the operated position, or the present invention may be embodied in signal systems which indicate physical operating conditions of the vehicle, as for example, low oil level, low oil pressure or low fuel level.

What is claimed is:

1. In a vehicular signal system adapted to be associated with a radio-equipped vehicle having a loudspeaker mounted within the vehicle to provide an audible signal interiorly of the vehicle, a source of potential, a signaling device operative to provide a visual signal exteriorly of the vehicle, a current interrupter operatively connected to said source of potential, normally open switch means, circuit means connecting said switch means to the loudspeaker, and means including said circuit means responsive to the closure of said switch means for establishing a circuit from said interrupter through said signaling device and through the loudspeaker to intermittently energize said signaling device and the loudspeaker.

2. In a vehicular signal system, a source of potential, a signal lamp operative to provide a visual signal exteriorly of the vehicle, a pilot lamp operative to provide a visual signal in the interior of the vehicle, a loudspeaker having a voice coil, said loudspeaker being mounted within said vehicle and operative to provide an audible signal in the interior of said vehicle, a current interrupter operatively connected to said source of potential, normally open switch means, and means responsive to the closure of said switch means for establishing parallel circuits from said interrupter through said signal lamp, said pilot lamp and said voice coil to intermittently energize said signal lamp, said pilot lamp and said voice coil.

3. In a vehicular signal system, a source of potential, a pair of signaling devices each operative to provide a visual signal, loudspeaker means operative to emit an audible signal, current interrupting means operatively connected to said source of potential, normally open switch means having two selectively operable positions, means responsive to the closure of said switch means in one operable position for establishing a circuit from said interrupting means through one of said signaling devices and said loudspeaker means to intermittently energize said one signal device and said loudspeaker means, and means responsive to the closure of said switch means in the other operable position for establishing a circuit from said interrupting means through the other of said signaling devices and said loudspeaker means to intermittently energize said one signaling device and said loudspeaker means.

4. In a signaling system for a vehicle having a source of potential, the combination including a pair of signal lamps each operative to provide a visual signal, loudspeaker means operative to emit an audible signal, current interrupting means electrically connected to said source of potential, a normally open switch having two selectively operable positions, means responsive to the closure of said switch in one operable position for establishing parallel circuits from said interrupting means through one of said signal lamps and said loudspeaker means to intermittently energize said one signal lamp and said loudspeaker means, and means responsive to the closure of said switch in the other operable position for establishing parallel circuits from said interrupting means through the other of said signal lamps and said loudspeaker means to intermittently energize said other signal lamp and said loudspeaker means.

5. In a vehicular signal system, a source of potential, a pair of signaling devices each operative to provide a visual signal, loudspeaker means operative to emit an audible signal, current interrupting means operatively connected to said source of potential, normally open switch means having two selectively operable positions, a plurality of rectifiers, circuit means including said rectifiers and responsive to the closure of said switch means for selectively establishing parallel circuits from said interrupting means through one of said signaling devices and said loudspeaker means to intermittently energize one of said signaling devices and said loudspeaker means.

6. In a turn signal system for an automotive vehicle having a source of potential, the combination including a pair of signaling devices each operative to provide a visual signal, loudspeaker means operative to emit an audible signal, current interrupting means operatively connected to said source of potential, normally open switch means having two selectively operable positions, an electrically operated relay having a pair of contacts, circuit means including one of said contacts and responsive to the closure of said switch means in one operable position for establishing parallel circuits from said interrupting means through one of said signaling devices and said loudspeaker means to intermittently energizes said one signaling device and said loudspeaker means, and circuit means including the other of said contacts and responsive to the closure of said switch in the other operable position for establishing parallel circuits from said interrupting means through the other of said signaling devices and said loudspeaker means to intermittently energize said other signaling device and said loudspeaker means.

7. In a vehicular signal system, a source of potential, a pair of signal lamps each operative to provide a visual signal, a loudspeaker operative to emit an audible signal, a current interrupter operatively connected to said source of potential, a normally open switch having two selectively operable positions, a plurality of rectifiers, circuit means including one of said rectifiers and responsive to the closure of said switch in one operable position for establishing parallel circuits from said interrupter through one of said signal lamps and said loudspeaker to intermittently energize said one signal lamp and said speaker, and circuit means including the other of said rectifiers and responsive to the closure of said switch in the other operable position for establishing parallel circuits from said interrupter through the other of said signal lamps and said loudspeaker to intermittently energize said other signal lamp and said loudspeaker.

8. In a turn signal system for an automotive vehicle having a source of potential, the combination including a pair of signal lamps each operative to provide a visual signal, a loudspeaker operative to emit an audible signal, a current interrupter operatively connected to said source of potential, a normally open switch having two selectively operable positions, an electrically operated relay having a pair of contacts, circuit means including one of said contacts and responsive to the closure of said switch in one operable position for establishing parallel circuits from said interrupter through one of said signal lamps and said loudspeaker to intermittently energize said one signal lamp and said loudspeaker, and circuit means including the other of said contacts and responsive to the closure of said switch in the other operable position for establishing parallel circuits from said interrupter through the other of said signal lamps and said loudspeaker to intermittently energize said other signal lamp and said loudspeaker.

References Cited in the file of this patent

UNITED STATES PATENTS

| 1,154,462 | Walz | Sept. 21, 1915 |
| 2,060,831 | Smith | Nov. 17, 1936 |
| 2,611,810 | Greene | Sept. 23, 1952 |
| 2,671,212 | Mingle | Mar. 2, 1954 |

U. S. DEPARTMENT OF COMMERCE
PATENT OFFICE

CERTIFICATE OF CORRECTION

Patent No. 2,830,284     Curtis W. Keegin     April 8, 1958

It is hereby certified that error appears in the printed specification of the above numbered patent requiring correction and that the said Letters Patent should read as corrected below.

Column 5, line 44, for "said one" read --said other--.

Signed and sealed this 10th day of June 1958.

(SEAL)
Attest:

KARL H. AXLINE

Attesting Officer

ROBERT C. WATSON
Commissioner of Patents